(12) United States Patent
Muraki

(10) Patent No.: US 7,620,827 B2
(45) Date of Patent: Nov. 17, 2009

(54) METHODS AND APPARATUS FOR COOLING INTEGRATED CIRCUITS

(75) Inventor: Yosuke Muraki, Campbell, CA (US)

(73) Assignee: Sony Computer Entertainment Inc., Tokyo (JP)

(*) Notice: Subject to any disclaimer, the term of this patent is extended or adjusted under 35 U.S.C. 154(b) by 510 days.

(21) Appl. No.: 11/504,931

(22) Filed: Aug. 16, 2006

(65) Prior Publication Data

US 2008/0046765 A1 Feb. 21, 2008

(51) Int. Cl.
*G06F 1/00* (2006.01)
*G05D 23/00* (2006.01)

(52) U.S. Cl. .................. 713/300; 700/299; 700/300; 703/13; 703/14; 716/1; 716/4

(58) Field of Classification Search ............ 713/300; 700/299, 300; 703/13, 14; 716/1, 4
See application file for complete search history.

(56) References Cited

U.S. PATENT DOCUMENTS

| | | | |
|---|---|---|---|
| 6,449,751 B1 * | 9/2002 | Hussain et al. ............ 716/4 |
| 7,016,819 B1 * | 3/2006 | Lui ......................... 703/2 |
| 7,149,674 B1 * | 12/2006 | Sirichotiyakul et al. ..... 703/15 |
| 7,206,950 B2 * | 4/2007 | Tanaka et al. ............ 713/322 |
| 7,343,505 B2 * | 3/2008 | Chotoku et al. .......... 713/340 |

* cited by examiner

*Primary Examiner*—Mark Connolly
(74) *Attorney, Agent, or Firm*—Matthew B. Dernier, Esq.; Gibson & Dernier LLP (57) ABSTRACT

A system and method are disclosed which may include measuring a leakage current level of a processor or multiprocessor chip; and storing an indicator value indicative of the leakage current level in a memory associated with the processor or multiprocessor chip.

29 Claims, 5 Drawing Sheets

102
MEASURE LEAKAGE CURRENT FOR A PLURALITY OF PROCESSORS OF A GIVEN TYPE

104
ESTABLISH LEAKAGE-CURRENT MEASUREMENT RANGE FOR THE PLURALITY OF PROCESSORS

106
DIVIDE MEASUREMENT RANGE INTO A PLURALITY OF SEGMENTS

108
ASSOCIATE EACH SEGMENT WITH AN INDICATOR VALUE

FIG. 2

LEAKAGE CURRENT

| Value | Fan RPM (idle) | Fan RPM (busy) |
|---|---|---|
| 0b00 | 2000 | 4000 |
| 0b01 | 2250 | 4250 |
| 0b10 | 2500 | 4500 |
| 0b11 | 2750 | 4750 |

METHODS AND APPARATUS FOR COOLING INTEGRATED CIRCUITS

BACKGROUND OF THE INVENTION

The present invention relates to controlling heat buildup in processors within computing systems, preferably within multiprocessor systems.

In recent years, there has been an insatiable desire for faster computer processing data throughputs because cutting edge computer applications are becoming more and more complex, and are placing ever increasing demands on processing systems. Graphics applications are among those that place the highest demands on a processing system because they require such vast numbers of data accesses, data computations, and data manipulations in relatively short periods of time to achieve desirable visual results. Real time, multimedia applications also place a high demand on processing systems; indeed, they require extremely fast processing speeds, such as many thousands of megabits of data per second.

While some processing systems employ a single processor to achieve fast processing speeds, others are implemented utilizing multi-processor architectures. In multiprocessor systems, a plurality of constituent processors can operate in parallel (or at least in concert) to achieve desired processing results.

Multiprocessor systems may be formed from processors that are manufactured separately. Under this approach, quality control systems may be used to ensure that each processor meets all pertinent standards before it is incorporated into a multiprocessor system. However, this approach is expensive as it requires a considerable number of separate manufacturing operations.

Alternatively, a multiprocessor system may be manufactured as a single integrated circuit to reduce manufacturing cost, to provide uniformity among the constituent processors, and to avoid difficulties arising from linking the various processors together once manufacturing is complete. However, such multiprocessor circuits incur the risk that a single non-performing processor within the multiprocessor circuit could cause the entire circuit to be discarded, thereby substantially reducing the overall yield of the circuits.

For example, there is a risk that one or more processors in a multiprocessor system could overheat due to the leakage current therein. Moreover, in modern processors, leakage current has tended to increase with the reduction in size and increase in number of the transistors therein. Further, leakage current increases with increasing temperature of a processor, which may lead to a self-perpetuating and uncontrollable rise in processor temperature during operation. It is therefore desirable to take measures to prevent any processor within a multiprocessor system from overheating in this manner.

There is usually variation in the leakage current among processors of any given design, owing to manufacturing process variations. Accordingly, one existing approach to preventing excessive temperatures within a multiprocessor environment is to discard high-leakage-current processors at the fabrication stage, prior to selecting processors for incorporation into a multiprocessor. While this method is effective in preventing overheating of the multiprocessor system, establishing a desirably low threshold for acceptable leakage current among the fabricated processors may result in a very low yield of useable processors.

The low-yield concern referred to above is of particular concern when the multiprocessor system is manufactured as a single integrated circuit because a single malfunctioning processor could cause an entire multiprocessor circuit to be discarded, thereby inflicting a greater burden on the overall yield than in the case where processors are manufactured independently and later incorporated into a multiprocessor system.

Accordingly, there is a need in the art to avoid the wasteful discarding of processors while still preserving the ability to prevent overheating of processors within a multiprocessor.

SUMMARY OF THE INVENTION

According to one aspect, the invention provides a method which may include measuring a leakage current level of a processor or multiprocessor chip; and storing an indicator value indicative of the leakage current level in a memory associated with the processor or multiprocessor chip.

According to another aspect, the invention provides a method which may include reading a value indicative of a leakage current of a first processor from a storage device; and establishing a speed of a fan adapted to direct air flow toward the first processor, the speed being a function of at least the value indicative of the processor leakage current.

According to yet another aspect, the invention provides an apparatus which may include a processor; a fan operative to direct air flow toward the processor; and a memory device in communication with the processor, the memory device storing a value indicative of a power level to be provided to the fan.

Other aspects, features, advantages, etc. will become apparent to one skilled in the art when the description of the preferred embodiments of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

Figure 1:
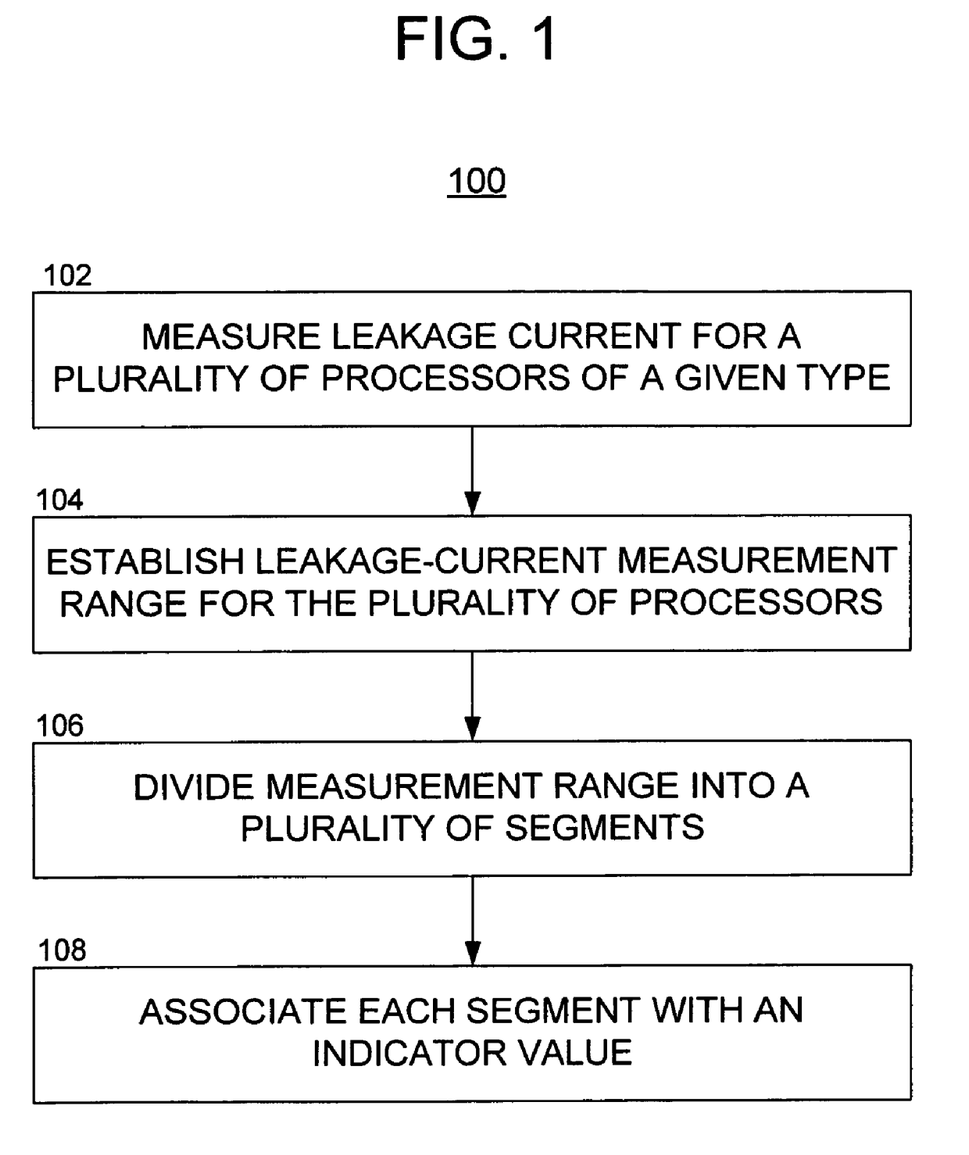
FIG. 1 is a flow diagram of a method for correlating values indicative of leakage current magnitude with respective leakage current measurement range segments for a given processor type in accordance with one or more embodiments of the present invention.
Figure 2:
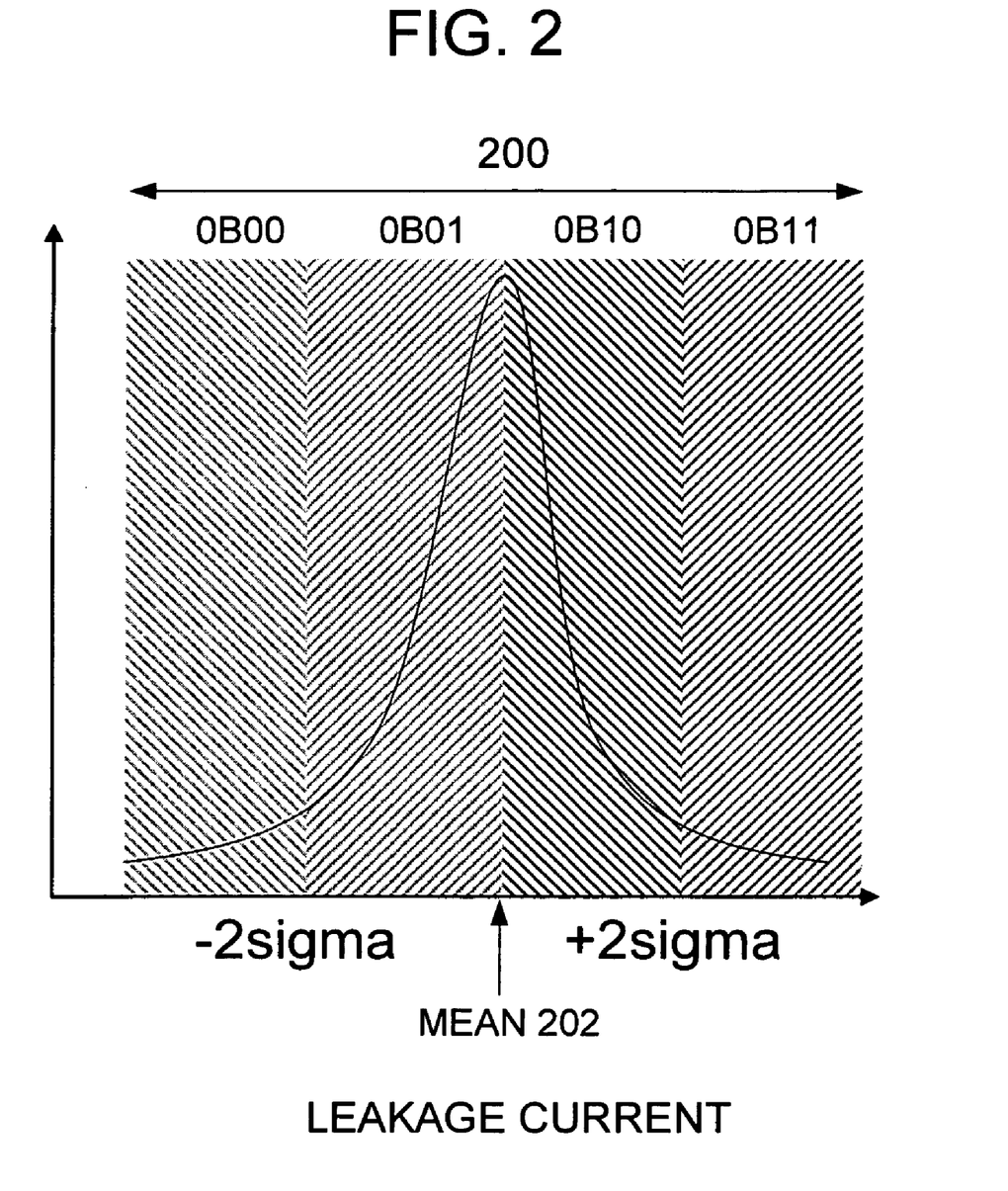
FIG. 2 is a graph of a distribution of leakage current values, among a plurality of processors of a given type, gathered in accordance with one or more embodiments of the present invention.
Figure 3:
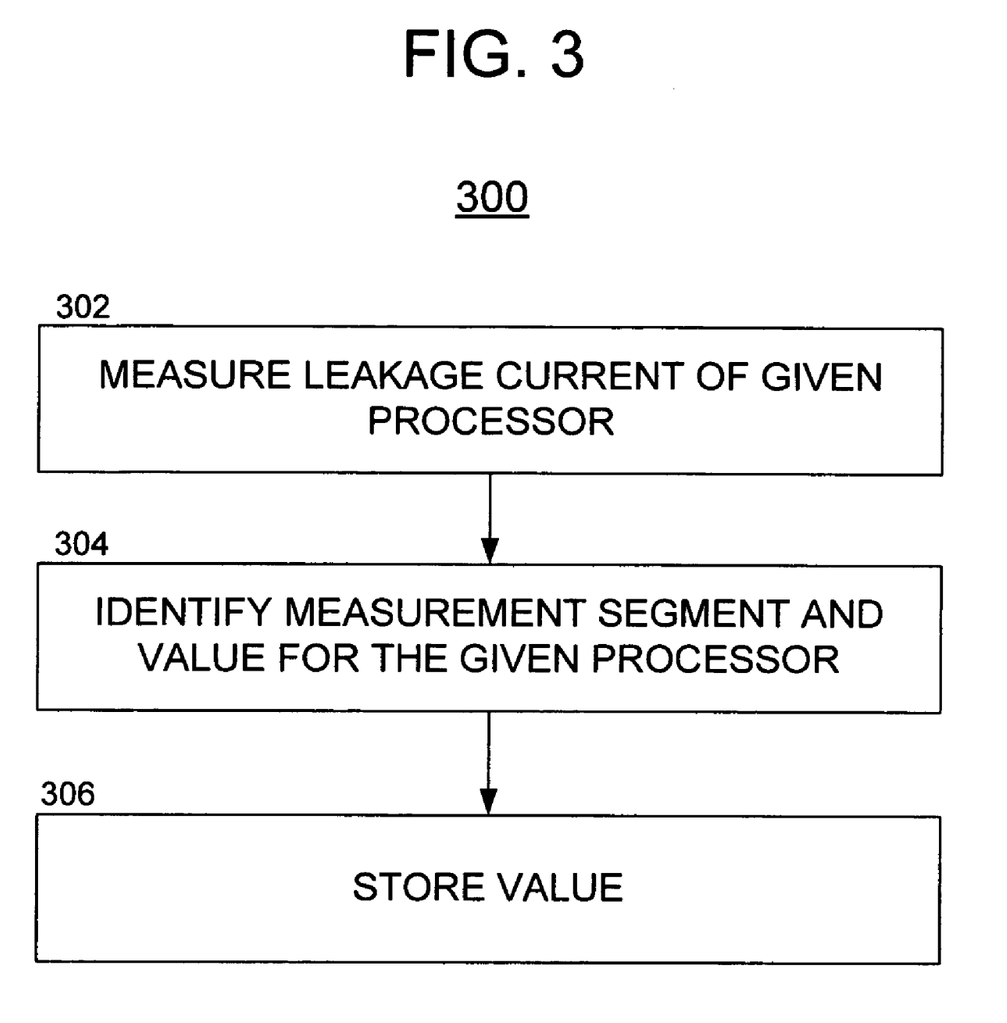
FIG. 3 is a flow diagram of a method for assigning a value indicative of leakage current magnitude to a given processor in accordance with one or more embodiments of the present invention.
Figure 4:
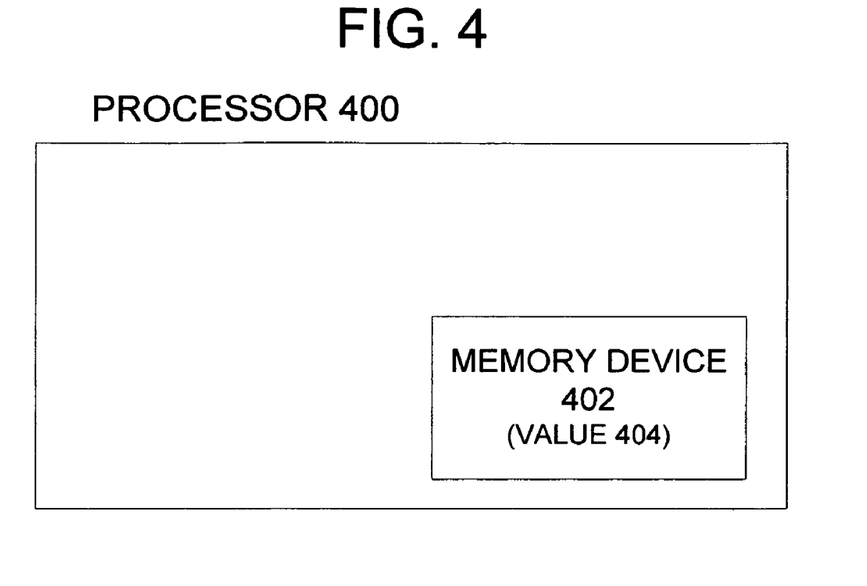
FIG. 4 is a block diagram of a processor including a memory device in accordance with one or more embodiments of the present invention.
Figure 5:
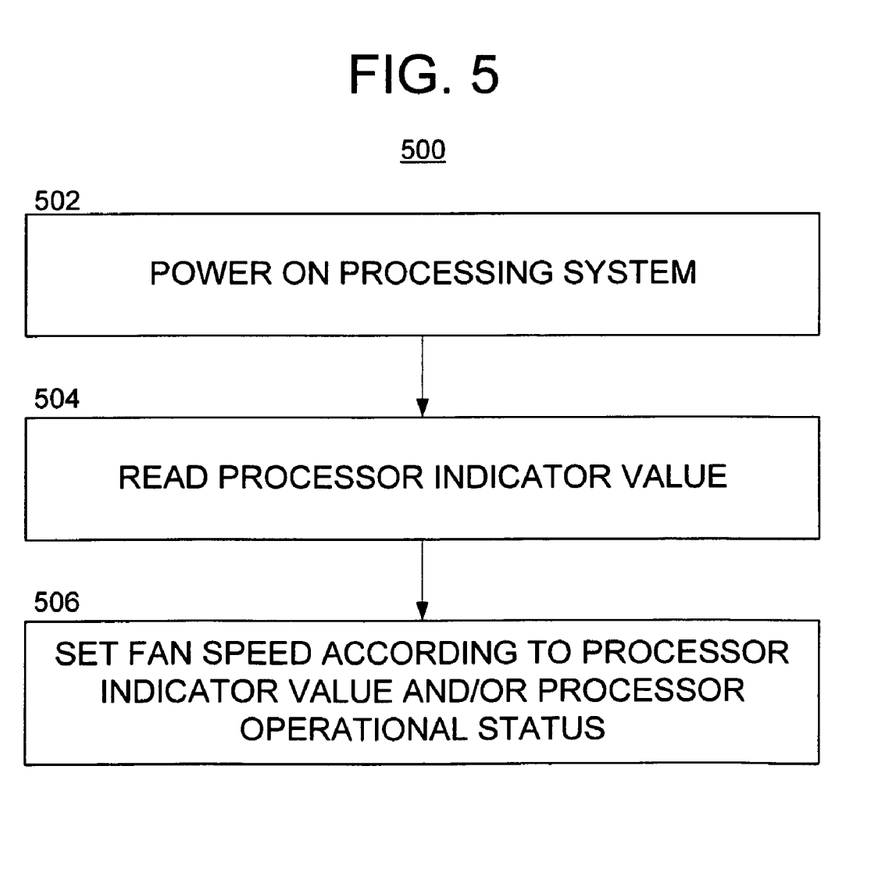
FIG. 5 is a flow diagram for a method for controlling the speed of a fan associated with a processor in accordance with one or more embodiments of the present invention.
Figure 6:
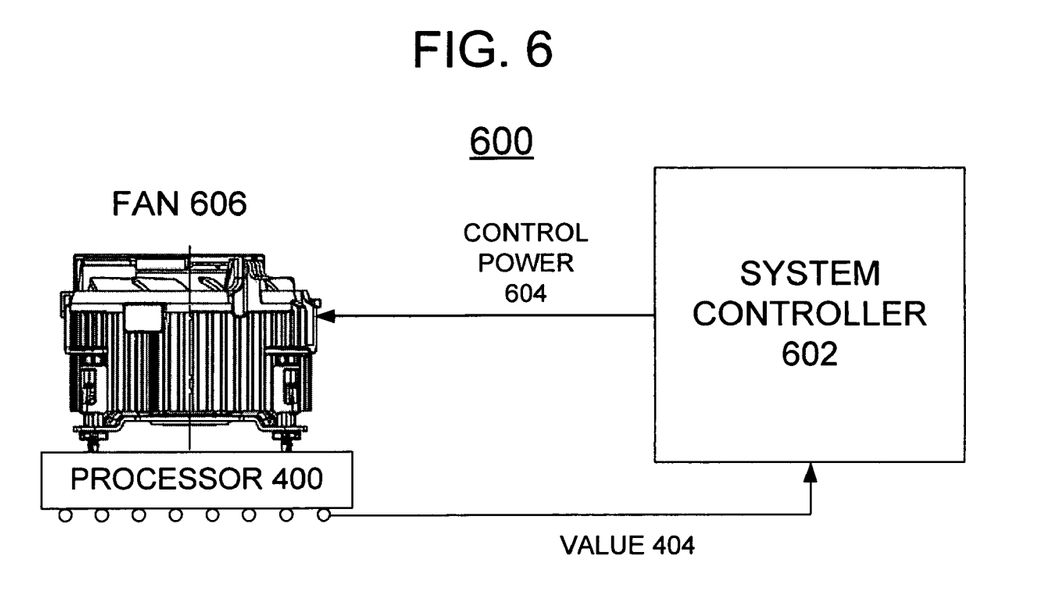
FIG. 6 is a diagram of a processing system in which fan speed may be controlled based on a processor leakage-current indicator value and/or on an operational status of a processor in accordance with one or more embodiments of the present invention.
Figure 7:
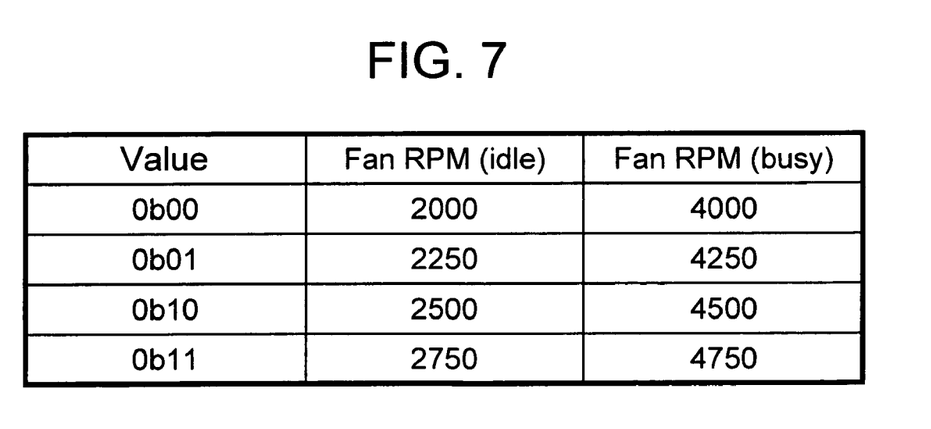
FIG. 7 is a table of fan speed values (in revolutions per minute) varying as a function of both leakage-current indicator value and processor operational status, in accordance with one or more embodiments of the present invention.

The operation of one or more embodiments of the present invention may be divided into three basic tasks. First, data is preferably gathered regarding the leakage current data for a plurality of representative processors of a particular type or design (FIG. 1). Numeric values may be then associated with respective segments of a measurement range resulting from this data gathering (FIG. 2). Second, leakage current data may be gathered for an individual processor to enable adjusting cooling activity for that processor once in operation within a processing system. (FIGS. 3-4). Third, data may be acquired for a given processor, within a multiprocessor system, to control cooling activity therefor (FIGS. 5-7). These three tasks are discussed in turn below.

It is noted that, in one or more embodiments, the above-discussed gathering of leakage current data and the control of cooling activity based on such gathered data may be conducted for a single processor, for a plurality of processors, for one entire multiprocessor chip, including a plurality of processors, and/or for a plurality of multiprocessor chips.

FIG. 1 is a flow diagram of a method for associating values indicative of leakage current magnitude with respective leakage current measurement range segments for a given processor type in accordance with one or more embodiments of the present invention. FIG. 2 is a graph of a distribution of leakage current magnitudes, among a plurality of processors of a given type, gathered in accordance with one or more embodiments of the present invention.

Directing attention to FIG. 1, at step 102, the leakage current for a plurality of representative processors of a given type or design may be measured. Generally, for the data to be meaningful, data is gathered for processors or multiprocessors of the same basic design or type. However, the invention is not limited to gathering data for processors of the same type or design. While the present invention is not limited to gathering data for any particular number of processors, it is believed that gathering data for twenty-five or more processors or multiprocessors is helpful in establishing a statistically significant data compilation.

At step 104, a leakage-current measurement range 200 (FIG. 2) may be established. For example, the total measurement range may include data within a range from two standard deviations above to two standard deviations below a mean value 202. Measurement values falling outside this established range may be treated as extraneous and excluded from further use. However, in one or more alternative embodiments, total measurement ranges either smaller or larger than the one described above may be employed. For instance, the total measurement range may include data falling with three or more standard deviations on either side of the mean value 202.

At step 106, the measurement range 200 may be subdivided into a plurality of measurement-range segments. In FIG. 2, measurement range 200 is subdivided into four segments, in this particular case "quadrants." However, in one or more alternative embodiments, measurement range 200 could be divided into fewer or more than four segments. Moreover, while the segments of FIG. 2 are of equal size, measurement range segments of varying size may be employed, and all such variations are intended to be included within the scope of the present invention.

For example, during a manufacturing process for a multiprocessor system, the number of segments could be increased to improve the part yield within that process. In one or more embodiments, when the total number of segments is increased over and above a common number, such as four, the segments may be of varying size.

At step 108, each segment provided in step 106 may be associated with a separate value that is indicative of processor leakage current. Any type of numeric value may be employed. However, in the embodiment of FIG. 2, digital values coded in binary form are employed. Proceeding from the lowest-magnitude to the highest-magnitude quadrant of leakage-current measurement in FIG. 2, it may be seen that these four quadrants, from left to right, are associated with the binary values 00, 01, 10, and 11, respectively, where the designation "0B" preceding each of these values indicates the use of binary numbers.

In an exemplary embodiment, the above values correspond to the following example of leakage current measurement range segments for a multiprocessor chip. In the following, "A" refers to amperes, and "IDDQ" refers to the leakage current for the chip.

TABLE 1

| Indicator Value | Leakage Current Measurement Range Segment |
| --- | --- |
| 00 | $1 A \leq IDDQ < 5 A$ |
| 01 | $5 A \leq IDDQ < 10 A$ |
| 10 | $10 A \leq IDDQ < 15 A$ |
| 11 | $15 A \leq IDDQ < 20 A$ |

The above leakage current values are exemplary. In actual practice, the leakage current measurement values within each segment and associated with each indicator value may be adjusted as needed to suit the data gathered for any particular multiprocessor or processor type. In one or more embodiments, the leakage-current values of the various segments may be higher or lower than those listed in Table 1 above. Moreover, leakage current levels higher or lower than those listed above may be experienced in other integrated circuit contexts. More specifically, the leakage current range for an individual processor may be less than that indicated in Table 1 for a multiprocessor chip.

The indicator values may be seen as crude representations of the leakage-current values for individual processors or individual multiprocessor chips. Preferably, the more numerous and the smaller the measurement-range segments are, the more precise the indicator value's representation of leakage current value will be. Where fine adjustments of cooling activity for a processor would be beneficial for the operation of a processing system, which may be a multiprocessor system, the leakage-current measurement range shown in FIG. 2 could be divided into eight, sixteen, or still more segments to enable more precise representation of each processor's leakage-current behavior by its indicator value.

Attention is directed to FIGS. 3 and 4 in connection with the following discussion. FIG. 3 is a flow diagram of a method 300 for assigning a value 404 indicative of leakage current magnitude to a given processor or multiprocessor chip in accordance with one or more embodiments of the present invention. FIG. 4 is a block diagram of a processor including a memory device in accordance with one or more embodiments of the present invention;

The processor 400 may be implemented utilizing any of the known technologies that are capable of requesting data from a system memory, and manipulating the data to achieve a desirable result. For example, the processor 400 may be implemented using any of the known microprocessors that are capable of executing software and/or firmware, including standard microprocessors, distributed microprocessors, etc. By way of example, the processor 400 may be a graphics processor that is capable of requesting and manipulating data, such as pixel data, including gray scale information, color information, texture data, polygonal information, video frame information, etc.

Memory device 402 (storage device) is preferably a non-volatile memory device, such as an EPROM (Erasable, Programmable Read-Only Memory), EEPROM (Electronically Erasable, Programmable Read-Only Memory), or other non-volatile data storage mechanism. In one embodiment, memory device 402 may be a digital fuse. In one or more alternative embodiments, memory device 402 need not be non-volatile.

While in the embodiment of FIG. 4, memory device 402 is shown as included within processor 400, this need not be the case. Memory device 402 could be merely in communication with processor 400, in which case, memory device 402 could be located either within or separately from processor 400.

For instance, in a multiprocessor system, memory device 402 could be located in one or more other processors and/or in a system controller (FIG. 6), so long as such devices are either directly, or indirectly, in communication with processor 400. In still other embodiments, memory device 402 may be omitted, and indicator value 404 may be stored in another, existing memory device.

While only one device is shown fulfilling the function of memory device 402, any number of storage devices may be employed. Moreover, memory device 402 may be a stand-alone memory, separate from other memories incorporated within processor 400.

Indicator value 404 is preferably indicative of a leakage current magnitude of processor 400. However, value 404 need not be stored within processor 400. Once determined, value 404 could be stored anywhere, so long as it is accessible when needed to determine a fan speed for a fan direct air flow toward processor 400. Alternatively, indicator value 404 could be indicative of the leakage current of a multiprocessor chip, in which case the indicator value could be stored in any memory device accessible by the multiprocessor chip.

Indicator Value 404 may be a digital value stored in hexadecimal, binary or other digital numeric form. However, in alternative embodiments, value 404 could be stored in analog form.

The method of FIG. 3 may be directed to generating data indicative of a leakage current level for a particular processor or multiprocessor and storing the data within the processor or multiprocessor itself for subsequent access within a computing system, which may be a multiprocessor system.

At step 302, the leakage current level of a given individual processor, or of a multiprocessor, may be measured. The leakage current measurement for the individual processor or multiprocessor is preferably conducted under the same conditions under which the data forming the plot of FIG. 2 were gathered.

At step 304, the segment of the leakage-current measurement range that the individual processor's or multiprocessor's measured leakage-current level falls within may be identified. Further, the indicator value 404 corresponding to the identified measurement range segment is preferably established.

At step 306, and with reference to FIG. 4, the indicator value 404 for the processor 400 may be stored in memory device 402. However, indicator value 404 may be stored on one or more other memory devices instead, either in processor 400, or elsewhere. An indicator value 404 for a multiprocessor chip may be stored in a system controller, such as system controller 602, or within any memory device accessible by the multiprocessor chip.

An example of an application of the method of FIG. 3 to a processor 400 is considered. At step 302, the leakage current of processor 400 is measured, preferably under the same conditions under which the data for FIG. 2 were gathered. In this example, the measured leakage current for the processor 400 equals 1.5 A. At step 304, we determine that 1.5 A, for a single processor, correlates to an indicator value 404 of "10". (Not shown in Table 1, which is directed to the leakage current of a multiprocessor chip).

Accordingly, in step 306, the indicator value 404 for processor 400 determined in step 304 may be stored in memory device 402 of processor 400. In one or more embodiments, once the indicator value 404 is stored in memory device 402, it remains an essentially permanent feature of processor 400. However, in one or more alternative embodiments, indicator value 404 could be modified to reflect changes in the performance, in the operating environment, or other changed condition of processor 400. It will be appreciated that while the above example is directed to determining the indicator value 404 of a processor, the same principles may be applied to determining the indicator value for a multiprocessor chip.

Having discussed the generation of data forming a statistical profile for leakage current measurements for a given type of processor and the determination and storage of an indicator value for an individual processor, it remains to describe the operation of a computing system (processing system) that includes a fan and an individual processor having indicator value 404 associated therewith.

Reference is made to FIGS. 5-7 in the following. FIG. 5 is a flow diagram for a method for controlling the speed of a fan 606 associated with a processor 400 in accordance with one or more embodiments of the present invention. FIG. 6 is a diagram of a processing system 600 in which fan speed may be controlled based on a processor leakage-current indicator value 404 and/or on an operational status of a processor 400 in accordance with one or more embodiments of the present invention. FIG. 7 is a table of fan speed values (in revolutions per minute) varying as a function of both leakage-current indicator value 404 and processor operational status, in accordance with one or more embodiments of the present invention.

Processing system 600 includes system controller 602, processor 400, and fan 606. System controller 602 may receive indicator value 404 from processor 400 and supply control power 604 to fan 606.

System controller 602 may be similar to processor 400 in construction but be dedicated to management of a processing system, such as a multiprocessor system. Alternatively, system controller 602 may be of different construction from processor 400 and be customized for performing the function of managing processing system 600.

Fan 606 may be a conventional electrically powered fan and be located proximately to processor 400 and/or to a multiprocessor chip and/or be adapted to direct air flow toward processor 400 and/or to a multiprocessor chip. Fan 606 may, but need not, be coupled to processor 400 and/or to a multiprocessor chip by one or more forms of mechanical attachment.

At step 502, processing system 600 is preferably powered on. At step 504, indicator value 404 of processor 400 is preferably read by system controller 602. System controller 602 may then determine the operational status of processor 400, which status may be either "idle" or "busy". At step 506, system controller 602 may adjust control power 604 to fan 606 to set the speed of fan 606 based on processor 400's indicator value 404 and/or on processor 400's operational status.

It will be appreciated that while the above discussion is directed to controlling the speed of fan 606 to cool processor 400, the same principles are applicable to controlling one or more fans directed to cooling a multiprocessor chip.

An example of fan speed control is considered in the following. We will consider the same processor discussed in the example above in which the leakage current is 1.5 A, and in which the corresponding indicator value 404 is "10." At step 502, system controller 602 may be powered on. At step 504, system controller may receive indicator value 404 which is equal to 10.

In this example, it is assumed that processor 400 is busy. Consequently, at step 506, system controller 602 may consult the table of FIG. 7 to determine the fan speed corresponding to the applicable indicator value 404 and the applicable processor operational status. Examining FIG. 7, it may be seen that for an indicator value of 10 and an operational status of "busy" for processor 400, the prescribed fan speed is 4500 r.p.m. (revolutions per minute). Accordingly, system controller 602 preferably adjusts control power 604 to cause fan 606 to run at 4500 r.p.m.

While the above example is directed to determining the speed of fan 606, for cooling processor 400, based on processor 404's indicator value 404, it will be appreciated that the same process may be applied to determining the speed of a fan for cooling a multiprocessor chip.

The fan speed values provided in FIG. 7 are exemplary. In other embodiments, fan speeds lower or higher than those listed in FIG. 7 may be employed. Moreover, if desired, the selected fan speed could be arrived at as a function of factors other than, or in addition to, indicator value 404 and the processor 400's operational status. Further, where convenient, the desired fan speed could be determined by tabulation (as described in connection with FIG. 7) and/or by calculation using mathematical formulae.

While processing system 600 shows system controller 602 interposed between processor 400 and fan 606, in one or more other embodiments, one or more other processing devices may be placed between processor 400 and fan 606 and be operative to receive indicator value 404 from processor 400 and to supply control power 604 to fan 606.

In still other embodiments, processor 400 could be directly connected to fan 606. In this case, fan 606 would preferably have the ability to receive control power 604 as a digital value and convert this value into an actual motor control signal. Alternatively, a simple digital-to-analog converter (DAC) could be located between processor 400 and fan 606 to accomplish at least a portion of any needed signal conversion. Likewise, a multiprocessor chip could be directly connected to a fan (using a DAC and any other needed signal processing means) or, alternatively, be connected to one or more devices interposed between the fan and the multiprocessor chip that fan operates to cool.

While the foregoing discussion is directed to the use of a cooling fan in proximity to a processor or multiprocessor, the invention is not so limited. The described cooling activity may be practiced on any electronic device susceptible to overheating and thereby benefiting from having a controllable-speed cooling fan direct air flow thereto.

Moreover, in one or more embodiments, a plurality of fans may be directed to cool a plurality of respective processors within a multiprocessor and/or to cool a plurality of respective multiprocessor chips. In one or more embodiments, one or more fans may be directed to cool a given multiprocessor chip as a whole, while one or more other fans may be directed to cooling one or more respective individual processors within the given multiprocessor chip.

It is noted that the methods and apparatus described thus far and/or described later in this document may be achieved utilizing any of the known technologies, such as standard digital circuitry, analog circuitry, any of the known processors that are operable to execute software and/or firmware programs, programmable digital devices or systems, programmable array logic devices, or any combination of the above. One or more embodiments of the invention may also be embodied in a software program for storage in a suitable storage medium and execution by a processing unit.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
    measuring respective leakage current levels of a plurality of representative processors;
    storing respective indicator values indicative of said leakage current levels in one or more memories associated with said processors; and
    establishing a leakage-current measurement range from said respective measured leakage-current levels.

2. The method of claim 1 further comprising adjusting a speed of a fan directing air flow toward at least one of said processors based on said indicator values.

3. The method of claim 1 wherein said storing step comprises storing said respective indicator values in respective memories within said processors.

4. The method of claim 1 wherein said storing step comprises storing said respective indicator values in respective non-volatile memories within said processors.

5. The method of claim 1 further comprising:
    associating said leakage current levels with one or more segments of a leakage-current measurement range; and
    associating said indicator values with said measurement range segments.

6. The method of claim 1 further comprising:
    dividing said leakage-current measurement range into a plurality of measurement range segments; and
    associating a separate indicator value with each said measurement range segment.

7. The method of claim 6 wherein said plurality of segments are of equal size.

8. The method of claim 7 wherein said equal-sized segments are quadrants of said measurement range.

9. The method of claim 6 wherein at least two of said segments have different sizes.

10. The method of claim 1 wherein said storing comprises programming one or more of said indicator values into one device selected from the group consisting of: an EPROM (Erasable, Programmable Read-Only Memory), an EEPROM (Electronically, Erasable, Programmable, Read-Only Memory), and a digital fuse.

11. The method of claim 1, further comprising:
    reading one or more of said respective indicator values from said one or more memories; and establishing a speed of a fan operating to direct air flow toward one or more of said processors, said speed being a function of at least one of said indicator values.

12. The method of claim 11 further comprising storing said respective indicator values in one or more memories within one or more of said processors.

13. The method of claim 11 wherein said reading step comprises reading a digital value indicative of one or more of said leakage currents.

14. The method of claim 13 further comprising storing said respective indicator values in one or more memories in communication with said processors.

15. The method of claim 11 wherein said reading step comprises reading said one or more indicator values from one or more digital fuses within one of said processors.

16. The method of claim 11 wherein said reading step comprises reading said value by a system controller within a multiprocessor system.

17. The method of claim 16 wherein said establishing comprises setting said fan speed by said system controller.

18. The method of claim 11 wherein said establishing comprises setting said fan speed by one or more of said processors.

19. The method of claim 11 wherein said fan is coupled to one or more of said processors.

20. The method of claim 11 wherein said fan speed is also a function of an operational status of at least one of said processors.

21. The method of claim 20 wherein said operational status is one of idle or busy.

22. The method of claim 11, further comprising reading at least two indicator values for at least two of said processors.

23. An apparatus, comprising:
   a plurality of processors;
   at least one fan operating to direct air flow toward one or more of said processors;
   a memory device in communication with one or more of said processors, said memory device storing respective indicator values indicative of respective leakage current levels of one or more of said processors; and
   a controller operating to establish a leakage-current measurement range from said respective measured leakage-current levels, and adjust a speed of the at least one fan directing based on said indicator values.

24. The apparatus of claim 23 wherein said memory device is located within one or more of said processors.

25. The apparatus of claim 23 wherein said memory device is non-volatile.

26. The apparatus of claim 23 wherein said memory device is selected from the group consisting of: an EPROM (Erasable, Programmable Read-Only Memory), and EEPROM (Electronically Erasable, Programmable Read-Only Memory), and a digital fuse.

27. The apparatus of claim 23 wherein said memory device is located on a device other than said processor.

28. The apparatus of claim 23 wherein the controller is a system controller interposed between one or more of said processors and said at least one fan.

29. The apparatus of claim 23 wherein said plurality of processors are incorporated into a multiprocessor system.

* * * * *

UNITED STATES PATENT AND TRADEMARK OFFICE
CERTIFICATE OF CORRECTION

PATENT NO.       : 7,620,827 B2                                              Page 1 of 1
APPLICATION NO.  : 11/504931
DATED            : November 17, 2009
INVENTOR(S)      : Yosuke Muraki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 603 days.

Signed and Sealed this

Twenty-sixth Day of October, 2010

David J. Kappos
*Director of the United States Patent and Trademark Office*